(12) United States Patent
Matthews, Jr. et al.

(10) Patent No.: US 8,676,870 B2
(45) Date of Patent: Mar. 18, 2014

(54) ACTIVE TEST AND ALTERATION OF SAMPLE TIMES FOR A RING BASED RANDOM NUMBER GENERATOR

(75) Inventors: Donald Preston Matthews, Jr., Longmont, CO (US); Laszlo Hars, Lafayette, CO (US)

(73) Assignee: Seagate Technology LLC, Cupertino, CA (US)

( * ) Notice: Subject to any disclaimer, the term of this patent is extended or adjusted under 35 U.S.C. 154(b) by 1104 days.

(21) Appl. No.: 12/631,904

(22) Filed: Dec. 7, 2009

(65) Prior Publication Data

US 2010/0106757 A1 Apr. 29, 2010

Related U.S. Application Data

(63) Continuation-in-part of application No. 11/856,762, filed on Sep. 18, 2007.

(51) Int. Cl.
*G06F 7/58* (2006.01)

(52) U.S. Cl.
USPC .......................... 708/250; 708/251; 708/255

(58) Field of Classification Search
None
See application file for complete search history.

(56) References Cited

U.S. PATENT DOCUMENTS

| | | | |
|---|---|---|---|
| 6,065,029 A * | 5/2000 | Weiss | ............................ 708/251 |
| 6,675,113 B2 | 1/2004 | Hars | |
| 6,947,960 B2 | 9/2005 | Hars | |
| 6,993,543 B2 | 1/2006 | Hars | |
| 7,031,991 B2 | 4/2006 | Hars | |
| 7,047,262 B2 | 5/2006 | Hars | |
| 7,124,155 B2 | 10/2006 | Hars | |
| 7,149,764 B2 | 12/2006 | Henry et al. | |
| 2003/0156713 A1 | 8/2003 | Hars | |
| 2003/0158875 A1 | 8/2003 | Hars | |
| 2003/0158876 A1 | 8/2003 | Hars | |
| 2003/0187598 A1 | 10/2003 | Hars | |
| 2003/0187889 A1 | 10/2003 | Hars | |
| 2003/0187890 A1 | 10/2003 | Hars | |
| 2003/0200238 A1 | 10/2003 | Hars | |
| 2003/0200239 A1 | 10/2003 | Hars | |
| 2004/0096060 A1* | 5/2004 | Henry et al. | .................... 380/46 |
| 2009/0077146 A1 | 3/2009 | Hars | |
| 2009/0077147 A1 | 3/2009 | Hars | |
| 2009/0110188 A1 | 4/2009 | Dolgunov et al. | |

FOREIGN PATENT DOCUMENTS

| | | |
|---|---|---|
| EP | 1447740 A1 | 8/2004 |
| EP | 1662375 A1 | 5/2006 |
| WO | WO2004051458 A2 | 6/2004 |

* cited by examiner

*Primary Examiner* — Michael D Yaary
(74) *Attorney, Agent, or Firm* — Cesari & Reed, LLP; Kirk A. Cesari; Christian W. Best

(57) ABSTRACT

An apparatus includes: a plurality of bit producing circuits; a controller setting a sample frequency at which bits from the bit producing circuits are sampled; and a plurality of test circuits determining if bits sampled from each of the bit producing circuits are random, wherein the controller adjusts the sample frequency if the test circuits determine that the sampled bits are not random. A method performed by the apparatus is also included.

20 Claims, 4 Drawing Sheets

ACTIVE TEST AND ALTERATION OF SAMPLE TIMES FOR A RING BASED RANDOM NUMBER GENERATOR

CROSS-REFERENCE TO RELATED APPLICATION

This application is a continuation-in-part application of U.S. patent application Ser. No. 11/856,762, titled "On-Line Randomness Test For Restart Random Number Generators", filed Sep. 18, 2007, which is hereby incorporated by reference.

BACKGROUND

One type of random number generator uses a drifting oscillator, designed to have large phase jitter. If the oscillator output is sampled slowly enough, the sample values will be effectively random. An appropriate sampling rate must be utilized. If the sampling rate is too fast, the sample values will be mostly determined by the ratio of the oscillator frequency and the sample rate. If this ratio is not simple, as for example 2:1 or 3:5, the sample sequence will look random, but in fact it will be pseudo-periodic (meaning that the sequence deviates from a periodic one only in a few places, determined by the occasional above average noise levels in the circuit). Detecting this problem on-line, that is, with a simple circuit constantly analyzing the generated sample sequence, is difficult because a pseudo-period can be quite long, and so large buffers are necessary.

To avoid the problem of hard to detect long pseudo-periods resulting in low entropy, restart mode random number generators have been proposed. After each sample is taken from the output of the drifting oscillator, the oscillator is reset. The oscillator is always restarted from the same initial conditions. The result is more robust operation and larger randomness, because the drifting oscillator is more sensitive to noise in its start-up phase.

When the drifting oscillator is restarted after every sample, sampling too fast can result in mostly equal samples, because the accumulated jitter is not large enough to cause uncertainties at the sampling point. This is much easier to detect than possibly long pseudo-periods. On-line randomness tests for restart mode random number generators (e.g., sampled drifting oscillators) have to detect long sequences of equal samples. Many currently used randomness tests (such as autocorrelation tests, poker tests, etc.) reliably detect a possible problem of this kind, but these tests are unnecessarily complex and expensive.

Currently used random number generators are designed very conservatively, such that the attainable entropy remains sufficient under all foreseen environmental conditions. This reduces the speed (throughput) under normal working conditions, and necessitates a very long and expensive circuit evaluation procedure, which has to be repeated at each minor change of the manufacturing process or technological advancement. A further problem is insufficient randomness when the random number generator is used in an environment that was not considered at the time of its design and the initial test phase.

SUMMARY

In one aspect, the invention provides an apparatus including: a plurality of bit producing circuits; a controller setting a sample frequency at which bits from the bit producing circuits are sampled; and a plurality of test circuits determining if bits sampled from each of the bit producing circuits are random, wherein the controller adjusts the sample frequency if the test circuits determine that the sampled bits are not random.

In another aspect, the invention provides a method including: using a plurality of bit producing circuits to produce a plurality of bits; setting a sample frequency at which bits from the circuits are sampled; determining if bits sampled from each of the bit producing circuits are random; and adjusting the sample frequency if the sampled bits are not random.

DETAILED DESCRIPTION OF THE INVENTION

In various aspects, the invention provides an electronic hardware random number generator (RNG), and a method of producing random numbers performed by the RNG. The RNG can be used in combination with various devices, such as data storage devices.

In restart mode random number generators, the problems set forth in the Background section can be alleviated by constantly tuning the sampling rate to its optimum, based on the results of simple and reliable on-line randomness testing. In one embodiment of the invention, the RNG includes an auto-tuning circuit that uses slow sampling of several independent ring oscillators. However it should be apparent that while ring oscillators are utilized in the examples below, the auto-tuning method could be used for other types of electronic RNG circuits.

In one aspect, the invention includes a bit producing circuit, a controller for setting a sample frequency at which bits from the bit producing circuits are sampled, and a test circuit for determining if the sampled bits are random, wherein the controller adjusts the sample frequency if the test circuit determines that the sampled bits are not random. The test circuit can test the randomness of a series of bits, by detecting the most likely erroneous, non-random behavior, for example a string of consecutive logic 1's or 0's.

Figure 1:
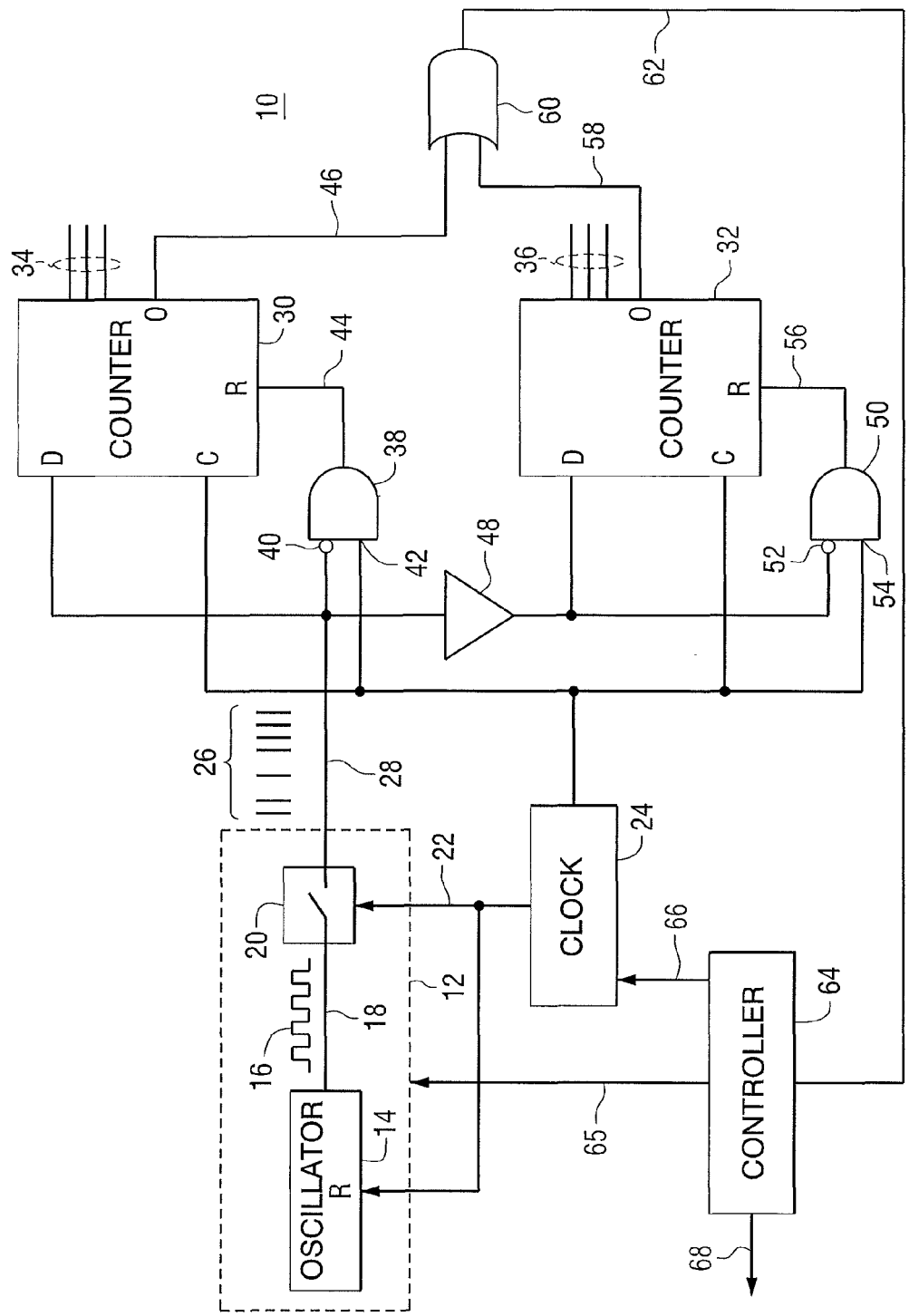
FIG. 1 is a schematic diagram of an apparatus that can be used in accordance with one aspect of the invention.

FIG. 1 is a schematic diagram of an apparatus 10 that can be used in one aspect of the invention. A random number generator 12 includes a drifting oscillator 14 that produces a square-wave signal with random edge jitter 16 on line 18. This signal can be in the form of voltage pulses, wherein the magnitude of the pulses represents a logic 1 or 0. Due to oscillator drift and jitter, the timing and duration of the pulses will not be uniform. The random number generator further includes a sampler 20. A clock signal on line 22, which can be produced by a clock 24, is used to control the times at which the sampler samples the pulses and to reset the oscillator. Since the series of pulses is subject to drift and jitter, the output of the sampler should be a series of random bits 26 on line 28.

The random number generator can operate in a restart mode, wherein the oscillator is restarted after each clock signal 22, such that the oscillator is brought into a known initial state and begins to generate a series of pulses. Due to drift and jitter, the timing of the pulses becomes uncertain and the pulses can be sampled to produce a random sequence of bits. One technique for on-line testing of the randomness of restart mode random number generators detects long sequences of equal samples. FIG. 1 provides a simple and inexpensive device that can implement this test technique.

In FIG. 1, the output of the sampler on line 28 is connected to a first counter 30 and a second counter 32. Each of the counters includes a data input D, a clock input C, a reset input R, and an overflow output O. The counters can also include a plurality of outputs 34 and 36 that represent a cumulative total of bits received on the data input between resets. An AND gate 38 has an inverting input 40 connected to line 28 and another input 42 connected to the clock signal. The output 44 of the AND gate is connected to the reset input of the first counter. When a logic 1 is received at the data input of counter 30, the count on the outputs 34 is incremented by 1. When successive logic 1's are received at the data input, the output will be the total number of successive 1's. When a logic 0 is received at the data input of counter 30, the counter is reset, and the output 34 is reset to all 0's. When the samples are random, the counter is frequently reset to 0. This way, it does not reach a high counter value. When the samples include a long series of logic 1's, the counter 30 may reach its maximum count and produce an overflow signal on line 46. This overflow signal represents a failure indication, which indicates that the sequence of bits on line 28 does not meet a desired randomness criteria.

The second counter 32 performs a similar function, but is reset when the current sample is a logic 1, effectively determining the length of the last all 0 sequence of the samples. This function is achieved by placing an inverter 48 between line 28 and the data input of counter 32. An AND gate 50 has an inverting input 52 connected to the inverter output and another input 54 connected to the clock signal. The output 56 of the AND gate 50 is connected to the reset input of the second counter.

When the samples include a long series of logic 0's, the counter 32 may reach its maximum count and produce an overflow signal on line 58. This overflow signal can be used to indicate that the sequence of bits on line 28 does not meet a desired randomness criteria. The overflow signals from the two counters can be combined in an OR gate 60 to produce a failure indication signal on line 62. Based on the failure indication signal, a controller 64 can then take appropriate action, such as adjusting the parameters of the oscillator 16 using a signal on line 65; or increasing the sampling time by controlling the clock with a signal on line 66 to allow for more uncertainty in the sample pulses. Alternatively, or in addition, the controller may provide a failure signal to the user of the random number generator on line 68.

In the example of FIG. 1, the two counters are incremented each time a bit is output from the random number generator. In this example, a sample is taken at each clock pulse. Alternatively, the counters can also be incremented faster or slower, or decremented with the same end effect.

Counter 30 is reset to the 0 count value when the current sample is a logic 0. This way, it does not reach a high counter value when the samples are random, that is, the counter gets restarted often from 0. Similarly, counter 32 is reset, when the current sample is a logic 1, effectively determining the length of the last all 0 sequence of the samples. When decrementing counters are used, a reset function can be implemented by loading predetermined limit values to the counters, and the overflow outputs would be activated, when the corresponding current count value reaches 0. Other counter configurations can be used to achieve the same effects.

The example of FIG. 1 uses an overflow signal as a failure indication signal. In another example, the output count of the counters could be monitored and the failure indication signal could issue when the count reaches some predetermined value or number. The test fails if the predetermined number is reached. At this point an interrupt command can issue, notifying the controller that an unusual event occurred.

In one example, if 5-bit counters are used, an interrupt can be issued when one of the counters reaches the maximum value (i.e., 31), indicating that 32 successive identical samples were encountered. This can occur in a truly random sequence, but very rarely. Its probability is $2^{-32}$, or one in 4 billion sequences of length 32. Such an occurrence is so infrequent that a practical system might discard the last 32 bits and continue operation. Then if the test fails again within a short period of time, the controller can conclude that the random number generator is broken, or under attack, and halts the random number generation, but other failure policies are possible as well.

Figure 2:
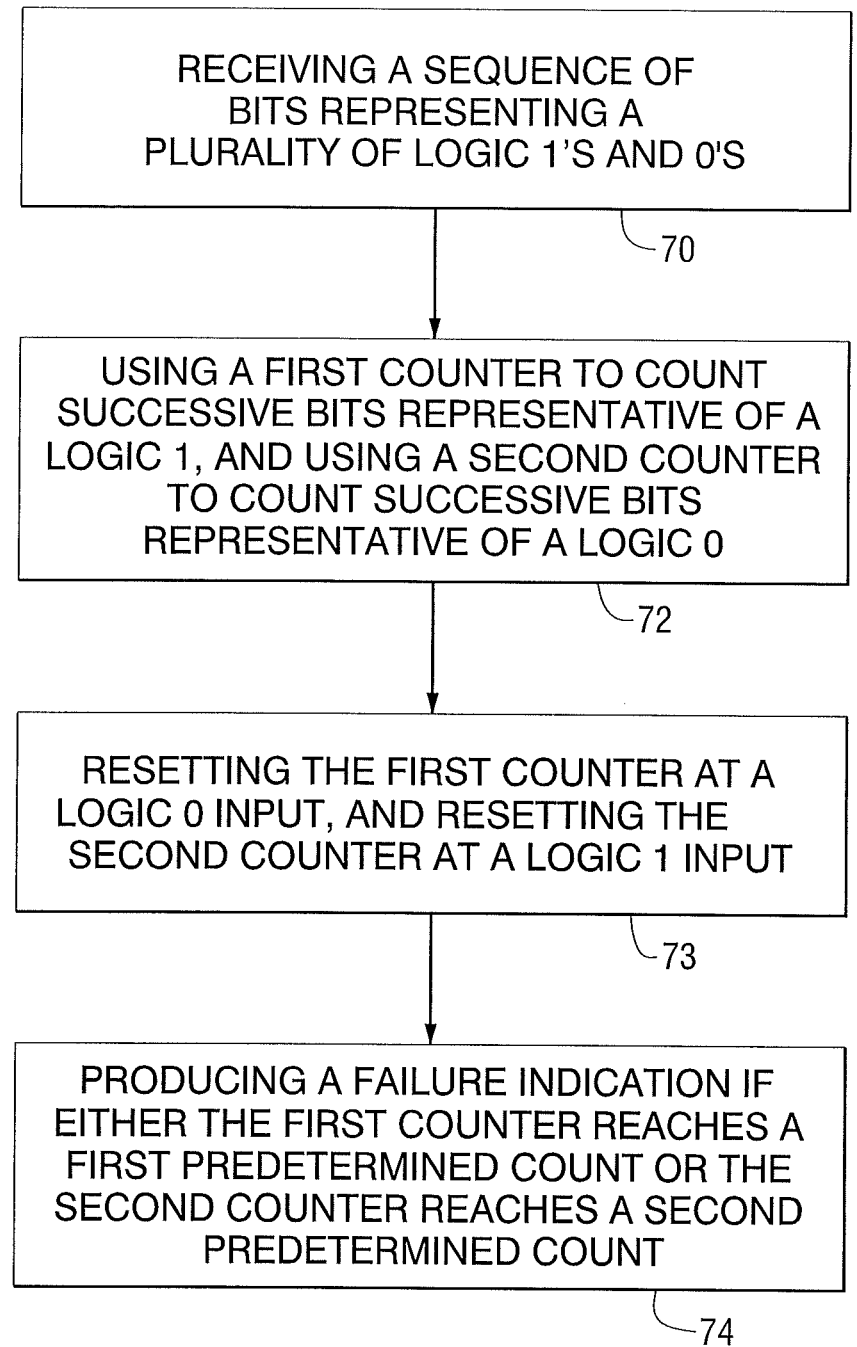
FIG. 2 is a flow diagram that illustrates a test for randomness.

FIG. 2 is a flow diagram that illustrates the test method implemented in the circuit of FIG. 1. FIG. 2 shows a method that begins by receiving a sequence of bits representing a plurality of logic 1's and 0's, as shown in block 70. A first counter is used to count the bits representative of a logic 1, and a second counter is used to count the bits representative of a logic 0, as shown in block 72. Block 73 shows that the first counter is reset (or restarted) when the binary bit is a logic 0, and the second counter is reset (or restarted) when the binary bit is a logic 1. If either the first counter reaches a first predetermined count or the second counter reaches a second predetermined count, a failure indication is produced, as shown in block 74.

Figure 3:
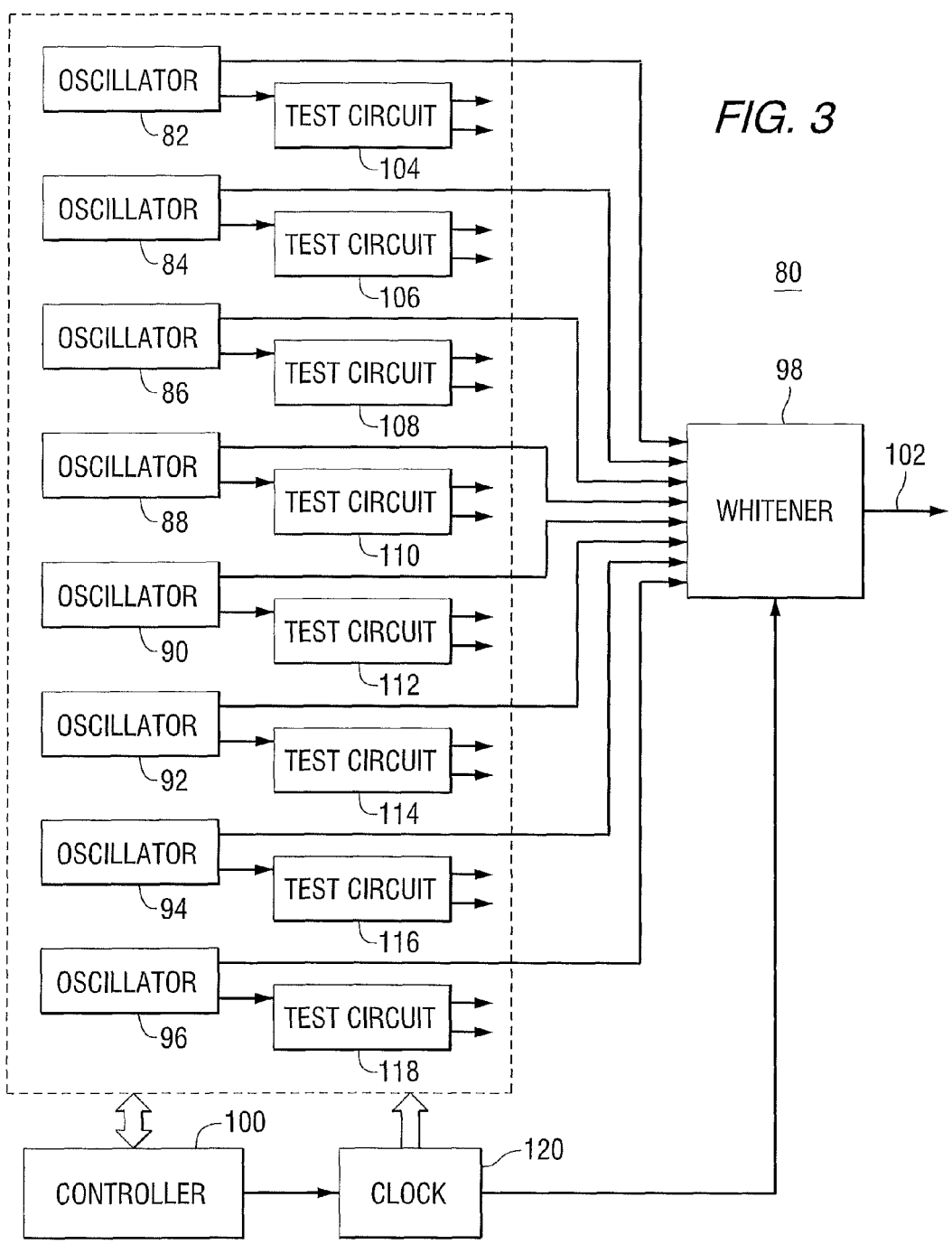
FIG. 3 is a block diagram of an embodiment of the invention.

FIG. 3 is a block diagram of a random number generator 80 in accordance with an aspect of the invention. The random number generator of FIG. 3 includes a plurality of ring oscillators that are used together to supply values to a whitener. The sample timing for the ring oscillators is controlled by a controller.

The random number generator includes a plurality bit producing circuits in the form of ring oscillators 82, 84, 86, 88, 90, 92, 94 and 96, which are sampled to produce output bits that are fed to a whitener 98. The whitener modifies the statistical distribution of the bits on which it operates and increases its level of randomness.

The whitening function may increase the level of randomness, for example, by making the output bits dependent on a large number of input bits and/or by removing biases from the input sequence (e.g., by diluting the sequence). In some embodiments, the whitening function may comprise a hashing function. Some exemplary hashing methods that may be used for whitening are the Secure Hash Algorithm 1 (SHA-1) and SHA-256 functions. Alternatively, cryptographic methods such as Advanced Encryption Standard (AES) and Data Encryption Standard (DES), as well as various other non-linear functions, can also be used for whitening.

The operation of the ring oscillators is controlled by a controller 100. Collectively, the ring oscillators act as a random number source that is used as a "seed" value into a whitener block that is used to produce the random number at output 102. This "seed" value should be as random as is possible. To generate this seed, the eight ring oscillators produce bits that are fed into the whitener 8 bits at a time (one bit from each ring oscillator).

To eliminate the possibility of the individual ring oscillator frequencies and the sample frequency being tied together in some way (to fowl a repeating pattern), the ring oscillators can be stopped before sampling and then reset to a known state before starting them again. If the sample frequency is too high (i.e., if the samples are taken too frequently), the additive jitter of the ring may not be sufficient to give a random output, and would generate a constant output. To detect this, a plurality of test circuits 104, 106, 108, 110, 112, 114, 116 and 118 are included. Each of the test circuits can include two counters configured such that the sampled data can be used to increment one of the two counters. One counter is incremented when the sampled value is a '0' and reset when the sampled value is a '1'. The other counter will increment when the sampled value is a '1' and reset when the sampled value is a '0'. This will count the number of constant values that are produced by sampling the ring. A clock 120 can be used to control the timing of the bit sampling and the whitener function.

The ring oscillators form a Random Number Source (RNS) that is used to produce a random seed value, which is used by the whitener to produce random numbers. The device of FIG. 3 includes multiple ring oscillators, and the sample frequency can be altered based on the number of ring oscillators that are producing constant values.

The circuit of FIG. 3 uses 8 ring oscillators. In one embodiment, as long as at least four of the ring oscillators are generating random values, the output of the whitener will be considered a true random number. This value is based on four of eight rings being random and 512 bits being hashed to produce the random value. This would give 256 of 512 bits of the input to the hash algorithm as being random numbers.

Figure 4:
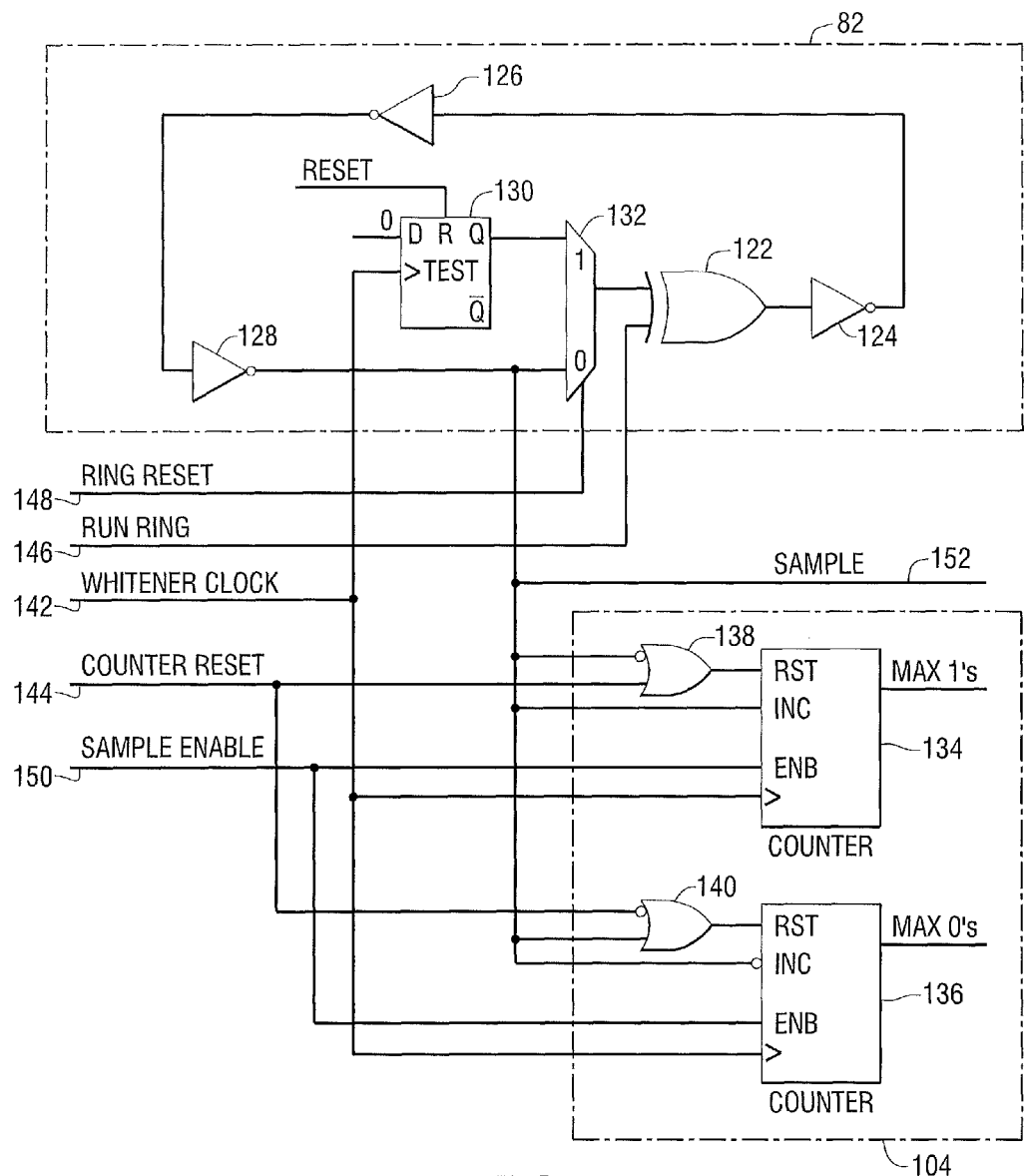
FIG. 4 is a schematic diagram of a ring oscillator and a test circuit.

FIG. 4 shows the basic structure for each ring oscillator and test circuit of FIG. 3, for example ring oscillator 82 and test circuit 104. The ring oscillator includes an XOR gate 122, a plurality of serially connected inverters 124, 126, 128 connected to an output of the XOR gate, a flip flop circuit 130 and a MUX gate 132 for supplying an input to the XOR circuit. While only three inverters are shown in the ring oscillator, it will be appreciated by those skilled in the art that additional inverters can be included in the inverter circuit branch.

The test circuit 104 includes a first counter 134 and a second counter 136, and a first OR gate 138 and a second OR gate 140. The first OR gate has an inverting input. One counter is incremented every time that the sampled value is a logic one and is reset when the sampled value is a logic zero. The second counter is incremented every time that the sampled value is a logic zero and is reset when the sampled value is a logic one. This circuit will effectively count the number of sampled values that are a constant value of either a logic one or a logic zero.

The inputs to the ring oscillator include the whitener clock signal on line 142, a counter reset signal on line 144, a run signal on line 146, a ring reset signal on line 148, and a sample enable signal on line 150. Samples are output on line 152. The whitener clock signal controls the timing of the flip-flop 130 and counters 134 and 136. The counter reset signal resets the counters. The ring run signal starts that ring oscillator. The sample enable signal enables the counters. The counter reset signal, run signal, ring reset signal, and sample enable signal would be supplied by the controller.

The whitener clock frequency can be, for example, 10 MHz. This clock frequency can be divided by 8 to produce the base sampling frequency, but will allow a SHA-1 hash engine to perform at a relatively faster rate. The performance of the RNG will depend on the sample rate.

In one embodiment of the circuit of FIG. 3, each of the ring oscillators can have a different number of inverters as part of the chain, to make each ring operate at a different frequency. This provides more randomness. Although any odd number of inverters would work, it is reasonable to use different numbers of inverters. This would provide rings having a different enough length so that the possibility of route delay (i.e., the propagation delay of the signal through the route wires between the gates) would not cause them to operate at similar frequencies.

In one example, a sequence of random numbers has been chosen to set the number of inverters. In that example, the 8 different rings have the following number of inverters: 31, 37, 41, 43, 47, 53, 59, and 61.

While FIG. 3 shows ring oscillators having inverters in the feedback circuit, it is also possible to use other logic gates. There needs to be at least one gate that performs an inversion function, but it is also possible to use buffers and other types of gates. Thus other types of gates can be used to arrive at the desired frequency.

To ensure that the rings do not have a stuck output under a fault condition, the ability to test the inverters in the ring is desired. This can be accomplished by having a scanable element (test flop) that is used to force a value into the ring. In addition, the reset state of the test flop and the ring reset signal will force a value into the ring so that the ring will always start with a true value and the same value.

The test circuits determine whether successive sampled values from each ring oscillator are constant. In one example, the whitener is the SHA-1 algorithm (Hash algorithm) that is designed to work on a 512-bit input block. Since 8 rings are sampled at the same time, 64 samples of those rings are needed to provide the 512-bit input block. For this design, there can be a 5 bit counter that sets a "max" bit for anytime it maxes out over the 64 samples that are taken to get a 512-bit hash input.

The controller is a state machine that is used to control the sample frequency and the changing of the sample frequency. The state machine can also perform all of the ring reset functions. The state machine can have the following states:

TABLE 1

Ring Oscillator States

| State | Description |
| --- | --- |
| IDLE | In this state, there is no request for a random number at this time. Therefore the RNG is idle. The rings are in the stopped state and the counters are reset. |
| RUN | This is the state where the rings are running and samples are being taken. |
| SAMPLE | This is the state where the rings are stopped and a sample of the ring value is taken. |
| RESET | This state is used to reset the rings to the default state. This ensures that the rings always start with the same value. |
| TEST | If four of the ring counters have maxed out during the 64 sample periods, then the sample frequency divisor is incremented and the counters are reset. Then the state will transition to the RUN state again. If three or fewer of the ring counters have maxed out during the 64 sample periods, the state will transition to the IDLE state and issue a done signal. |

The RUN-SAMPLE-RESET set of states can repeat a minimum of 64 times (for the 64 samples). The transition from RUN to SAMPLE occurs when the sample frequency count indicates that it is time to sample. The sample time is given a default value and changed (incremented) if the randomness test fails for the 64 samples. If the SHA-1 engine in the whitener is still running, the state will not be allowed to transition and the sample indicator will remain set to sample. Logic can be included that will prevent the state machine from transitioning from the RUN state to the SAMPLE state. This allows the SHA-1 operation to be done concurrently with the rings running for sampling operations.

In the TEST state, the sample frequency divisor mentioned in Table 1 refers to a factor that is used to reduce the clock frequency. In one example, the 10 MHz clock frequency is divided by 8. That resulting clock (1.25 MHz) is then used to increment a counter. When the count value matches the sample frequency divisor value, the rings are sampled and the counter is reset.

In one embodiment, the base clock frequency of the RNG will be 10 MHz. The base clock frequency controls the whitener and the entire control state machine. This includes all of the control logic and the SHA-1 hash algorithm that is used for whitening. All sampled data will be presented for the hashing operation, which will ensure that even if one ring oscillator is running with random data, eventually there will be enough random data to generate a true random number from the output of the hash algorithm.

If the controller determines that more than a predetermined number of ring oscillators (e.g., four ring oscillators) fail the randomness test performed by the test circuits, then the controller will reduce the sample frequency. Each time the sample frequency is decreased, it can be decreased by a division of the ⅛ of the frequency. The initial sample frequency can be at ⅛ of the base clock frequency. The fastest sample rate would at 1.25 MHz, and the first alteration to the sample frequency will then be at 625 KHz. In this example, all rings are sampled at the same rate, but it is possible to sample the different rings at different frequencies.

In one example, the state machine can run the ring oscillators and perform 64 sample operations. At the end of the 64 samples, a test would be performed to determine how many rings did not put out constant values (at least 31 constant example either 63 or 31 constant values), a bit can be set that indicates that the associated ring oscillator is not producing random numbers. This bit is only reset when the sample frequency is altered. If four rings have this bit set, then a sample frequency divider count value would be incremented and all of the counts are reset.

Table 2 gives an example of the amount of time required to get a random number based on the ratio of sample frequency to ring oscillator frequency. The table data is based on a design that will always run for 64 samples (to get one hash block) before testing for good results. Table 2 shows the delay in getting the value at each frequency and the ratio of sample frequency to ring frequency at these given times.

For the time to generate values listed in Table 2, it is assumed that the whitener (i.e., a SHA-1 hash operation) will take 320 cycles, that there are 20 cycles of overhead (reset rings, stop rings for sample, etc.), and that there will be 64 samples taken before four rings are detected generating a constant value. This could be either a 31-bit count value that takes some time to get a constant value for 31 cycles or a 63-bit count value that generates a constant count value almost from the beginning.

Table 2 shows the time required to generate a random number based on the number of times the sample frequency has to be altered to get at least 5 rings that are producing random data. The columns of the table are defined as follows.

The Sample Attempt is the "round" number of the sampling. At the beginning this will be one and for each time that the sample frequency has to be altered, it will be incremented by one.

The Sample Frequency is the frequency at which the rings will be sampled. This is determined by dividing the base frequency by 8 times the Sample Attempt number.

The Time is the time required to perform the 64 samples at this frequency.

The Total Time is the cumulative time required to sample and hash all of the samples at all of the different sample attempts.

The Ratio is the ring oscillator frequency divided by the Sample Frequency. This is performed at the nominal frequencies of 200 MHz, 500 MHz, and 750 MHz. The randomness is based on the square root of this value times the jitter time of the ring.

TABLE 2

| | | | | | | |
|---|---|---|---|---|---|---|
| RNG Generation Time | | | | | | |
| Sample Attempt | Sample Frequency | Time | Total Time | Ratio 200 MHz | Ratio 500 MHz | Ratio 750 MHz |
| 1 | 1.25 MHz | 8.52 uS | 8.52 uS | 160 | 400 | 600 |
| 2 | 625 KHz | 13.64 uS | 22.16 uS | 320 | 800 | 1200 |
| 3 | 416.7 KHz | 18.76 uS | 40.92 uS | 480 | 1200 | 1800 |
| 4 | 312.5 KHz | 23.88 uS | 64.80 uS | 640 | 1600 | 2400 |
| 5 | 250 KHz | 29.00 uS | 93.80 uS | 800 | 2000 | 3000 |
| 10 | 125 KHz | 54.60 uS | 315.60 uS | 1600 | 4000 | 6000 |
| 50 | 25 KHz | 259.40 uS | 6.698 mS | 8000 | 20000 | 30000 |
| 100 | 12.5 KHz | 515.40 uS | 26.196 mS | 16000 | 40000 | 60000 |
| 150 | 8333 Hz | 771.40 uS | 58.494 mS | 24000 | 60000 | 90000 |
| 200 | 6250 Hz | 1.027 mS | 103.592 mS | 32000 | 80000 | 120000 |
| 215 | 5814 Hz | 1.104 mS | 119.617 mS | 34400 | 86000 | 129000 |
| 255 | 4902 Hz | 1.309 mS | 167.984 mS | 40800 | 102000 | 153000 | values in a row over the 64 samples). If four rings put out constant values, the sampling will be performed again at a lower sampling frequency.

The counters in the test circuits count the number of constant values from a ring. Once a counter tops out (at for The ring oscillators can be turned on and the sample held until after the hash operation has finished, this will save some time on the initial sample.

From the above description, it can be seen that the RNG includes an entropy source (i.e., the oscillators) and pseudo random number generator (PRNG) (i.e., the whitener) that whitens the entropy. The entropy source comprises free-running ring. oscillators that are sampled to obtain random data. In the example of FIG. 3, 8 free-running ring oscillators are sampled and fed into the PRNG.

It is assumed that the ring oscillators have jitter due to process variation, temperature, and voltage. Given enough time between samples, the additive ring jitter will be greater than the cycle time of the ring. If the accumulated jitter is greater than the ring period, random data will be output.

The ring oscillators can be sampled 64 times (for a total of 512 bits for the PRNG SHA-1 Hashing Operation). Each ring oscillator output is tested to ensure that the ring oscillators are producing semi-random numbers. This testing looks for a string of samples that has the same value. In one example, the test is for 32 constant samples in a row. If this test is not met, the ring oscillator is considered to not have run randomly.

Of the 8 ring oscillators, if less than a predetermined number 'X' ran randomly within the 64 samples, the sample frequency will be reduced to give the rings more time to accumulate jitter.

After each sample, the ring oscillators are reset to a constant starting value. This reset is done to ensure that the sample frequency and each ring oscillator are not some multiple of each other that will generate a sequence of bits (non-random) that is not detectable.

It is possible to use a jittery source clock, to "alter" the sample time. The seed value can be stored and added to a 144-bit value in the whitener to save on gates and processing time of doing longer additions. When the random number generator is used in a device such as a disc drive, if a 512-bit entropy sample did not pass the randomness test, the random result is not presented to the rest of the hardware and the process is repeated with a new 512-bit entropy sample. This 144-bit value is an internal state of the whitener. Therefore, when a randomness test fails, there is still some randomness that is saved in this whitener internal state.

There is another mechanism that can ensure that run times are not forever. Assume for example, that it is required that 4 rings are to run randomly and no matter how the sample frequency is changed, there will never be 4 rings running randomly. In this case, a side counter can be used to indicate the total number of rings that have run randomly (for this example, the side counter is incremented by 3 each time 64 samples are taken). This counter will be incremented for each ring that passes the randomness testing (up to 8 rings each 64 samples).

When the count in the side counter reaches a threshold value (i.e., some arbitrary predetermined value), the output of the whitener is considered a good random value because of the internal state capturing the randomness of the previous 512-bit samples. Thus if only one ring is running randomly and the others are not, then that one ring will eventually give enough random data to consider the number generated random. This is the case with any ring that runs randomly.

Extra hash operations can be performed before returning a random result. For example, if 10 extra hashes are requested, then 11 random results would be produced with just the last one being sent to the firmware. This allows for extra ring data to be collected to produce a random number. If one extra hash is selected, then there has to be two times where 512 bits are collected (64 samples of each of the 8 rings). In addition, each of those two 512-bit samples has to pass the randomness test. This would be equivalent to telling the random number generator to return every other value produced.

From the above description, it can be seen that the invention adds intelligence to the low level hardware. The generated random bits are continuously monitored and tested in the RNG circuit itself, and the parameters of the RNG are adjusted based on the current quality of the available physical randomness (which could depend on environmental factors, like supply voltage or temperature, but the quality also changes as the circuit ages). The auto-tuning feature ensures reliable function of the RNG under changing conditions or under attack, and it guarantees sufficient physical entropy for even the most demanding cryptographic applications. Entropy amplification (i.e., compression) can also be performed via in-circuit hashing, with a cryptographically secure hash function.

Because the circuit is an electronic RNG, it is independent on the physics of the drive. If used in data storage devices, the RNG can be used with both rotating media and solid state drives.

In another aspect, the invention provides a method performed by the RNG. The method includes: using a plurality of circuits to produce a plurality of bits; setting a sample frequency at which bits from the circuits are sampled; determining if the sampled bits are random; and adjusting the sample frequency if the sampled bits are not random.

The implementations described above and other implementations are within the scope of the following claims.

What is claimed is:

1. An apparatus comprising:
   a plurality of bit producing circuits;
   a controller setting a sample frequency at which bits from the bit producing circuits are sampled; and
   a plurality of test circuits determining if bits sampled from each of the bit producing circuits are random, wherein the controller adjusts the sample frequency if the test circuits determine that the sampled bits are not random.

2. The apparatus of claim 1, wherein each of the bit producing circuits comprises:
   a ring oscillator.

3. The apparatus of claim 1, further comprising:
   a whitener that receives the bits sampled from each of the bit producing circuits and processes the sampled bits to produce a random number output.

4. The apparatus of claim 3, wherein:
   the controller adjusts the sample frequency if the test circuits determine that the sampled bits from at least a predetermined number of the bit producing circuits are not random.

5. The apparatus of claim 3, wherein the whitener subjects the sampled bits to a hash algorithm.

6. The apparatus of claim 3, wherein:
   the whitener has an internal state that is combined with the sampled bits to produce the random number output.

7. The apparatus of claim 3, wherein:
   the whitener hashes the sampled bits more than once.

8. The apparatus of claim 1, wherein:
   the controller restarts the bit producing circuits in response to a randomness failure.

9. The apparatus of claim 1, wherein:
   the controller determines the number of the bit producing circuits that are producing random samples; and
   an output of the apparatus is considered to be random when the number of the bit producing circuits that are producing random samples reaches a predetermined number.

10. A method comprising:
    using a plurality of bit producing circuits to produce a plurality of bits;

setting a sample frequency at which bits from the circuits are sampled;

determining if bits sampled from each of the bit producing circuits are random; and adjusting the sample frequency if the sampled bits are not random.

11. The method of claim 10, wherein the plurality of bits are produced by a plurality of ring oscillators.

12. The method of claim 10, further comprising:
whitening the sampled bits to produce a random number output.

13. The method of claim 12, wherein the whitening step subjects the sampled bits to a hash algorithm.

14. The method of claim 12, further comprising:
adjusting the sample frequency if the sampled bits from at least a predetermined number of bit producing circuits are not random.

15. The method of claim 10, further comprising:
restarting the bit producing circuits in response to a randomness failure.

16. The method of claim 15, wherein:
restarting is not done until a 512-bit set of samples is hashed and an internal state of a whitener saved.

17. The method of claim 16, wherein:
when a randomness test fails, a next 512-bit set of samples is combined with the whitener internal state.

18. The method of claim 10, further comprising:
counting a total number of rings that have run randomly; and when the total number of rings that have run randomly reaches a specified value, the total number of random bits is considered sufficient.

19. The method of claim 10, further comprising:
performing extra hashing operations before returning a random number.

20. An apparatus comprising:
one or more test circuits configured to determine if bits sampled from one or more bit producing circuits are random; and a circuit configured to:
adjust a sample frequency, of which bits from the one or more bit producing circuits are sampled, if the one or more test circuits determine that the bits from at least a predetermined number of the one or more bit producing circuits are not random.

\* \* \* \* \*